(12) United States Patent
Di Giorgio et al.

(10) Patent No.: US 7,894,856 B2
(45) Date of Patent: Feb. 22, 2011

(54) PROCEDURE FOR PROCESSING USER'S IDENTIFICATION NUMBERS IN COMMUNICATION NETWORKS CORRESPONDING COMMUNICATION TERMINAL SIM-CARD AND COMPUTER PRODUCT

(75) Inventors: Vincenzo Di Giorgio, Rio de Janerio (BR); Domenico Francesco Puntillo, Rio de Janerio (BR)

(73) Assignee: Tim Italia S.p.A., Milan (IT)

( * ) Notice: Subject to any disclaimer, the term of this patent is extended or adjusted under 35 U.S.C. 154(b) by 182 days.

(21) Appl. No.: 10/567,753

(22) PCT Filed: Aug. 13, 2003

(86) PCT No.: PCT/IT03/00509

§ 371 (c)(1),
(2), (4) Date: Aug. 2, 2006

(87) PCT Pub. No.: WO2005/018208

PCT Pub. Date: Feb. 24, 2005

(65) Prior Publication Data

US 2006/0270453 A1    Nov. 30, 2006

(51) Int. Cl.
*H04B 1/38* (2006.01)
(52) U.S. Cl. .................. 455/558; 455/403; 455/564
(58) Field of Classification Search .............. None
See application file for complete search history.

(56) References Cited

U.S. PATENT DOCUMENTS 6,317,597 B1   11/2001   Baker et al.
6,360,108 B1 *  3/2002   Rogers ..................... 455/564
6,418,311 B1    7/2002   Chmaytelli et al.
6,449,497 B1    9/2002   Kirbas et al.
6,542,733 B1 *  4/2003   Dennis ..................... 455/414.1
2001/0049738 A1 12/2001  Doi

FOREIGN PATENT DOCUMENTS

| EP | 0 631 418 A1 | 12/1994 |
| EP | 1 239 650 A1 | 9/2002 |
| GB | 2 355 624 A | 4/2001 |
| WO | WO-00/64128 | 10/2000 |
| WO | WO-02/058364 A2 | 7/2002 |

\* cited by examiner

*Primary Examiner*—Phuoc Doan
(74) *Attorney, Agent, or Firm*—Finnegan, Henderson, Farabow, Gattett & Dunner, L.L.P.

(57) ABSTRACT

A terminal for telecommunications networks, such as a mobile telephone, has at least one storage area for storing user indicators and acting as an electronic address book and processing capacity for processing user indicators stored in the storage area. The terminal is configured for organizing the indicators in at least a first and a second configuration. The first configuration has identifiers organized with the insertion of an identification code of an operator, such as long distance operator, selected by the user of the terminal, while the second configuration has identifiers organized with the inclusion of at least one of a country prefix and a local prefix. The user can thus make calls with the aid of his/her electronic address book without having to manually modify the stored numbers when the user moves (physically or in terms of service) between environments characterized by different telephone number configurations, without having to change back the numbers in the address book on return to the usual environment.

35 Claims, 1 Drawing Sheet

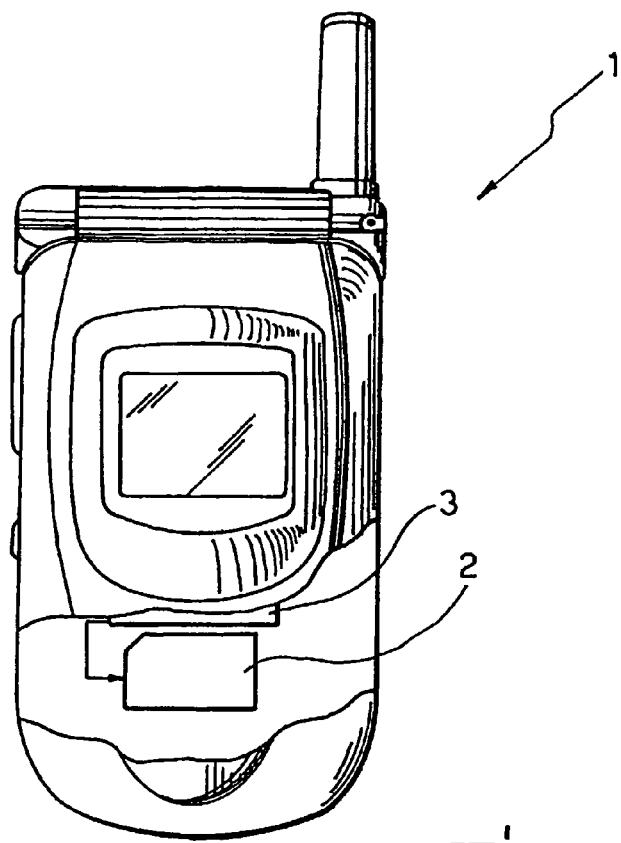
Fig_1
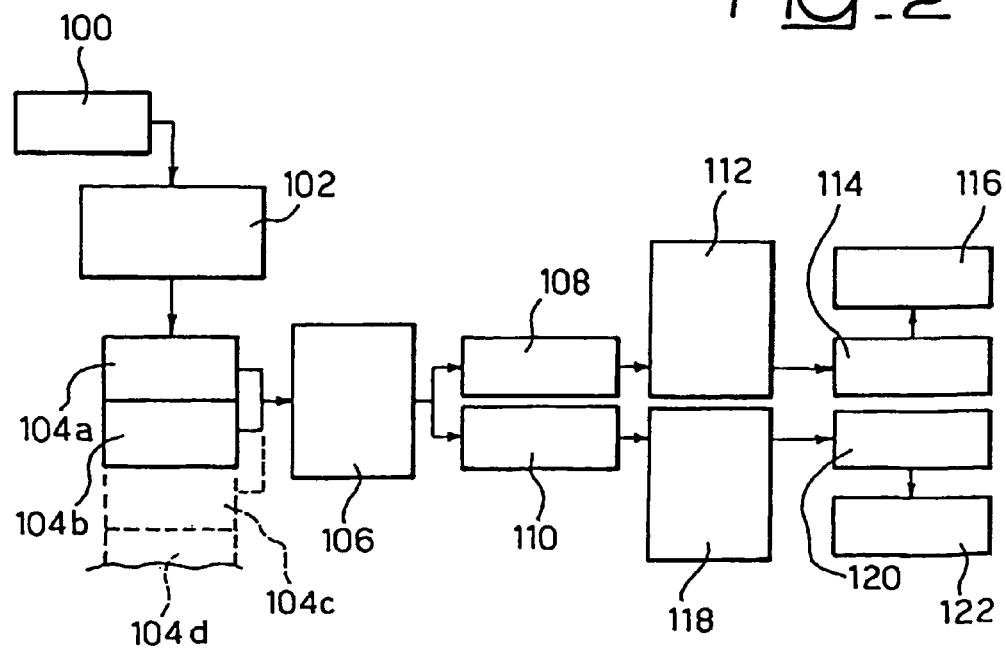
Fig_2

US 7,894,856 B2

PROCEDURE FOR PROCESSING USER'S IDENTIFICATION NUMBERS IN COMMUNICATION NETWORKS CORRESPONDING COMMUNICATION TERMINAL SIM-CARD AND COMPUTER PRODUCT

CROSS REFERENCE TO RELATED APPLICATION

This application is a national phase application based on PCT/IT2003/000509, filed Aug. 13, 2003, the content of which is incorporated herein by reference.

TECHNICAL FIELD

The present invention relates to methods for processing user identification numbers in communications networks.

DESCRIPTION OF THE KNOWN ART

Various applications require the processing, for example the modification and/or supplementing, of the identification numbers of users of a communications network, such as a mobile communications network.

For example, U.S. Pat. No. 6,360,108 describes a communications terminal provided with a storage area for storing one or more prefixes to be prepended automatically to a destination telephone number. The destination number can be entered manually by the user using a keypad or automatically entered from a telephone number storage area. The system analyzes the destination telephone number and determines whether one or more prefix prepending levels have been enabled. If the answer is positive, the system automatically prepends the selected prefixes to the user-entered destination telephone number so as to generate a complete destination telephone number. The method can be extended to all the telephone numbers entered by the user, or can be limited to telephone numbers contained in the telephone number storage area contained in the terminal. Similarly, the system can be enabled continuously, or can be disabled when the user turns off the equipment.

U.S. Pat. No. 6,418,311 describes a system for receiving SMS data packets transmitted from a cell site to a mobile station in order to update the contents of an address book located in a non-volatile RAM within the mobile station. Upon the occurrence of a particular event, such as a change in the area code, the system can automatically update the phonebook so that it is not necessary to determine which prefixes have been modified and then carry out manual updating.

EP-A-1,239,650 describes an "intelligent" method for accessing the address book function available in mobile telephones. A table of country codes/prefixes and area codes is used to analyze the telephone numbers entered from time to time. All this is done in such a way that, when stored in the electronic address book, the number is complete, in other words contains the country code as well as the area code. A method is described for analyzing the type of telephone number to be dialed in order to determine the characteristics of the aforesaid exact number. The user no longer has to manually enter the country codes, extension numbers or the like.

Additionally, WO-A-02/058364 describes a method and apparatus for editing the telephone numbers stored in an electronic phonebook of an electronic device. A phonebook editor can modify part, such as an area code, of one or more telephone numbers stored in the phonebook. By providing a change criterion, an old area code and a new area code have been defined, all the numbers stored in the phonebook matching the change criterion can have their old area code changed to the new area code.

OBJECT AND BRIEF DESCRIPTION OF THE PRESENT INVENTION

The present invention is intended to resolve a problem (or, more correctly, a set of problems) that may arise in the context of certain regulatory frameworks in the telecommunications sector, according to which the calling user must always be able to select the operator to be used for trunk or long-distance (LD) calls. For example, a regulatory regime of this kind exists at the present time in Brazil.

Because of this situation, numbers must be arranged (formatted) (for example at the level of storage in the electronic address book that is associated to a mobile communications terminal, e.g., in a SIM) in different ways in order to enable calls to be made or text messages to be sent: this means that the numbers in the address book must be stored in a plurality of different formats.

For example, again with reference to the present situation in Brazil (although this is not to be interpreted as limiting the scope of the invention), a mobile telephone user can be obliged, depending on the situation, to use different number and/or identification formats stored or storable in an electronic address book.

More precisely, the formats in question can be:

local numbers, in formats from 7 to 8 digits, local numbers having a local prefix (area code) for a given area, comprising 10 or 11 digits, local and long distance numbers to which a local prefix is added and with the identification called CSP corresponding to the operator which the user wishes to use for the long distance call; these numbers consist of 12 or 13 digits;

international numbers including country and local prefixes; these numbers have variable numbers of digits and, although they were valid under previous regulations and therefore potentially present in users' electronic address books, they now have a format which is incorrect for Brazil;

international numbers containing the CSP indicator, together with the country and local prefixes; these numbers have variable numbers of digits;

international numbers with country and local prefixes, containing 12 or 13 digits; and numbers for access to special services, typically having 10 or 11 digits.

The applicant has observed that the picture outlined above is made even more critical by the fact that the user of a given mobile terminal may need to travel, possibly rather frequently, between a country or geographical region subject to a regulatory regime of the type described above and countries or regions where different rules are applicable, for example where the user is not able to select the operator identified by the CSP from time to time.

The object of the present invention is to resolve the criticality inherent in the situation outlined above, in such a way as to enable the mobile telephone user to make calls and receive text messages correctly without having to enter the whole of the corresponding number from time to time and/or having to modify the items stored in the electronic address book.

According to the present invention, this object is achieved by means of a method having the characteristics claimed specifically in the following claims. The invention also relates to the corresponding communications terminal, a corresponding SIM-type card and a computer program product which can be loaded into the memory of at least one electronic computer and which comprises portions of software code for implementing the method according to the invention when the product is executed on an electronic computer.

In the preferred embodiment, the method is implemented at the level of the individual communications terminal, in particular at the level of the electronic address book resident in the memory of said terminal and/or in a memory which can be separated from the terminal, such as a SIM or equivalent module.

Essentially, the solution described herein enables the user to make calls with the aid of his/her electronic address book without having to manually modify the stored numbers when the user moves (physically or in terms of service) to an environment characterized by a different configuration for telephone numbers. All this can be done without having to change back the individual numbers manually in the electronic address book on return to the usual environment.

In a preferred embodiment of the invention, the change between at least two different configurations is initiated directly by the user (although it is possible for this change to be initiated by the network by means of a remote command, after detection of the fact that the user's geographical or service environment has changed). The corresponding procedure analyzes the formats of the numbers present in the address book stored in the telephone (for example in a portable telephone, preferably a mobile/cellular telephone, and even more preferably in the SIM of a mobile/cellular telephone), and converts this format according to one of at least two possible configurations.

The network can intervene if necessary to modify, by an action known as "downloading", the procedure stored in the memory associated with the terminal or with the SIM. This is done in such a way as to enable the user to switch the numbers in his/her address book to new configurations.

The downloading operation can also have the purpose of modifying said procedure to take into account variations in the configuration, for example following changes in regulations or the marketing of new products.

Downloading tools, currently known as SIM Application Toolkits, for implementing this function are well known in the art, and are also encoded according to standards such as the GSM standard.

Alternatively, the procedure can be installed directly in terminals during their manufacture, or can be distributed to users (and updated) by loading it into SIMs or other memories which can be separated from the terminals, distributed to new users or designed to replace the SIMs used in different situations in which the same elements of criticality arise.

The solution described herein is suitable for use in relation to services such as facilitated prepaid roaming services in which the numbers in the address book have to be configured by entering a special code to enable the user to make roaming calls which normally require the entry of a code (string) next to the number. This code is a special string designed to be interpreted by the network. This string typically initiates a process in which the client is called back by the network and connected to the desired number.

The solution described herein can resolve the criticality associated with this type of service by reconfiguring the numbers in the address book of the terminal or SIM of a client who intends to use this service in such a way that roaming calls can be facilitated.

A further example which can be cited is that of services which make it possible to request that the call is debited to the person who is to be contacted, with activation from other countries if required.

In this case also, by using the solution described herein, the address book can be reconfigured by preparing all the stored numbers to be called in this special format.

In a preferred embodiment of the solution described herein, one of the at least two configurations applied to the numbers in the electronic address book is the standard configuration with the format "+ (country code or prefix) (area code or prefix) (telephone number)". This is the standard configuration which enables Italian users or users based in many other countries to make calls either from their own countries or from abroad.

BRIEF DESCRIPTION OF THE ATTACHED DRAWINGS

The invention will now be described, purely by way of example and without restrictive intent, with reference to the attached drawings, in which:

FIG. 1 is a schematic and partially cut-away view of a telephone terminal in which the solution described herein can be applied, and FIG. 2 is a functional block diagram showing the criteria for implementation of the solution described herein.

DETAILED DESCRIPTION OF EXAMPLES OF EMBODIMENT OF THE INVENTION

In FIG. 1, the reference 1 indicates the whole of a communications terminal, such as, typically, a mobile telephony communications terminal. By way of example, this may be a terminal configured or configurable to operate according to any mobile telephony standard such as the GSM, GPRS or UMTS standards.

Within the mobile terminal 1 there is indicated the presence of a storage area 2 containing the telephone address book and a storage area 3 which contains the application program for reconfiguring the address book according to a plurality of possible options.

The storage areas 2 and 3, shown here as separate entities essentially for functional reasons, can in reality both be located in a removable memory, such as the SIM card (or similar) associated with the terminal 1 or can both be in the terminal itself. It is also possible for one of the storage areas 2 and 3 to be located in the terminal and the other in the removable memory. It is also possible to have hybrid solutions, in which different parts of the storage areas 2 and 3 are distributed in different ways according to the localization criteria described.

In the following text it is assumed that the storage area 2 can act as an electronic address book, storing within it a certain number of telephone identifiers of users with whom a communication link is to be established.

The additional storage area 3 contains or is capable of containing an application program associated with a corresponding capacity for processing the contents of the user telephone identifiers stored in the storage area 2.

According to the terminology used in the following claims, the terminal 1 therefore constitutes a terminal for telecommunications networks comprising at least one storage area for storing user indicators, acting as an electronic address book and providing processing capacity for processing user indicators stored in this storage area.

All this is done according to principles which are known in the art and consequently will not be described in detail herein.

As indicated above, the terminal 1 and the corresponding storage area 3 can be configured (also according to well-known systems) in such a way that they can be subjected to a function known as "downloading" which can activate the installation or modification/reconfiguration of the application program in the storage area 3 on the basis of signals/commands received remotely by the terminal 1, from the corresponding communications network for example.

The solution described herein considerably facilitates the management of the format of the numbers contained, for example, in the electronic address book associated with a mobile telephone 1, by automatically formatting each number, in such a way as to enable the user to make calls and send text messages in the correct way, without needing to modify the address book item by item.

In the following text, for the sake of clarity, some examples are given with reference to the application environment as presently provided for in Brazil. However, the fact of referring to this specific application environment must not be interpreted as limiting the scope of the invention.

In particular, it should be remembered that the acronym CSP in this context denotes the identifier of a long distance operator which the user has selected for making the corresponding calls. This code can be a code selected previously during the definition of the user profile at the network of the operator to which the user subscribes. The CSP code in question therefore essentially corresponds to the code currently known as the PIC (Preferred Inter-exchange Carrier).

For the sake of completeness, it should also be noted that this identification code can actually be an identifier of any operator, not necessarily a long distance operator; in this context, we may mention the fixed network operator preselection codes which can currently be activated in the fixed telephone networks present in Italy.

With regard to the example of numbering used at present in Brazil, the operating procedures will now be described with reference to the various types of numbering considered previously.

Local Numbers

As stated previously, these are numbers comprising 7 or 8 digits each. In this case, the reformatting operation is to include the "0", the prefix relating to the city, supplied by the user, and the CSP code. Thus the numbers stored in the storage area 2 (in the following text the storage area is identified with the SIM card) and originally having 7 or 8 digits each are converted by adding 5 supplementary digits.

Local Numbers Already Having Local Prefixes (Area Codes)

These numbers initially comprise 10 or 11 digits each. They are reformatted to include the CSP code, in other words by adding two supplementary digits when they have been stored in the SIM card.

Local Numbers Already Having Local CSP Prefixes (Relating to any Operator)

In this case, the numbers initially comprise 12 or 13 digits each; the reformatting can comprise the replacement of the previous CSP code with a new CSP code identifying a new operator.

International Numbers (with no CSP Code)

These are numbers comprising a variable number of digits whose format is intrinsically incorrect for use, for example, in Brazil. In this case, the reformatting operation essentially relates to the identification of an error, since the number as originally stored does not correspond to a suitable format.

International Numbers (with CSP Code)

In this case, the format (with a variable number of digits) is correct, and the reformatting operation can comprise the replacement of the previously stored CSP code with a new CSP code for another operator.

International Numbers (Preceded by the "+" Symbol)

These numbers, having a variable number of digits (where the "+" symbol is considered as a digit), are already in a format conforming to an international standard with the GSM standard. In this case, the reformatting operation comprises the inclusion of the digits "00" in place of the "+" and the addition of the CSP code.

Numbers for Access to Special Services

These are numbers with 10 or 11 digits each, which commence, for example, with the digits 0800, 0300 or 0500: their formats are usually intended for local use, and therefore are not intended to be modified.

By way of further illustration, reference will now be made to the functional diagram of FIG. 2. This is essentially a diagram illustrating the man-machine dialog which can take place between a terminal, such as a mobile telephone provided with the functions described herein, and the corresponding user.

The reference 100 indicates in a general way a step of activating the function of reconfiguring the address book illustrated herein. The step 102 indicates a corresponding display.

The next step is ideally divided into a plurality of sub-steps or functions 104a, 104b, 104c, 104d, . . . , essentially corresponding to the instructions given or the selection made by the user from the menu of a desired operating mode.

In particular (again with reference to the Brazilian numbering system, but without restrictive intent), the step in question enables the user to select from the address book functions corresponding to a first configuration (to be used for example when the user is in Brazil—step 104a) and to a second configuration (to be used when the user is outside Brazil—step 104b).

Further functions 104c, 104d (and others if required, indicated in FIG. 2 in broken lines to emphasize their optional nature) can be provided to enable the user to make a selection from further possible configurations of the address book.

Examples of such further configurations are indicated below.

It will be appreciated that the selection associated with steps 104a and 104b (and 104c, 104d if present) can also be made automatically by using the capacity of the terminal 1, and/or of the network with which it is associated, to determine (by known means) whether at any given moment it is in the network of the country of subscription or is operating outside this network.

The reference 106 indicates a step in which the user is presented with a message asking him/her to enter the corresponding local area code, using two digits for example. This step leads on to two subsequent steps indicated separately as 108 and 110, according to the selection made in steps 104a and 104b (for the sake of simplicity, reference will be made to these two options only, in the following text).

In particular, the step 108 can consist of the display to the user of a message indicating the possibility of using a particular operator (for example the one to whose service the user subscribes) as the long distance operator in order to determine the corresponding reconfiguration in the storage area 2.

At this point, the user is asked, in a step 112, to give his/her consent (for example by pressing a confirmation key) and this act typically causes the issuing of other messages intended to reassure the user: these may include, for example, messages indicating that the corresponding reconfiguration may require a certain amount of time (step 114) and the display of a "wait" message (step 116).

In an entirely parallel way, a step 118 following the step 110 can correspond to the display of a message indicating that the electronic address book can be reconfigured to facilitate international calls when the user is outside Brazil, for example. The user is also informed that the consent which he/she gives, again by pressing a confirmation key, will cause the addition of the corresponding country prefix to the numbers stored in the storage area 2. In this case also, the granting of consent by the user causes the corresponding reconfiguration procedure to be activated, with the sending of messages in steps 120-122 which are essentially similar to the steps 114-116 examined above.

Normally, the wait messages 116 and 122 are presented while the corresponding application carries out the function of reconfiguring the numbers in the storage area 2.

According to known rules, if the user does not give his/her consent to the execution of any given operations the system remains in a waiting state, and, in the absence of such consent, the storage area 2 retains its previous configuration.

Essentially, both in the case of operation in the context of the option stated in step 104*a* (user located "in Brazil", in the example considered here) and in the case of a choice of the configuration expressed in step 104*b* (user "outside Brazil", in the example considered here), the routines implemented for reconfiguring the storage area 2 are essentially organized on the basis of an "if" mechanism (a function having the purpose of recognizing the nature and characteristics of the number to be processed in the configuration) and a "then" mechanism (a function which implements the rule according to which the indicators are reformatted).

Initially, the typical situations arising in the situation identified by step 104*a* (user "in Brazil") are considered below.

Numbers with 7 or 8 Digits

The "if" function identifies the fact that the number in question does not have the local prefix (area code) and has a length of 7 or 8 digit.

The "then" function adds the prefix in question (area code) and the CSP code.

The aforesaid codes are prepended to the initial 7- or 8-digit numbers and the final numbers therefore have 12 or 13 digits.

In particular, the local prefix (area code) is designed to be entered by the user. What is known as an applet verifies the format of the numbers in the address book and adds the missing codes. If the user does not provide the necessary local code (area code), the applet does not change the numbers but leaves them in their 7- or 8-digit format.

Example 8113119 (7 digits)=0 41 21 8113119 (12 digits)
81131195 (8 digits)=0 41 21 81131195 (13 digits)

Numbers with 10 or 11 Digits

In this case, the "if" function initially checks the length of the initial number (10 or 11 digits), and also verifies the presence of other conditions:
the first digit is 0,
the second digit is different from 0, and
the third digit is different from 0.

In this case, the reconfiguration operation that is required is essentially the addition of the CSP code, usually comprising two digits (for example "41").

The "then" function then proceeds to shift the number of a digit to the right and to add the CSP code if the three aforementioned conditions are present.

Example 0 21 8113119 (10 digits)=0 41 21 8113119 (12 digits)
0 21 81131195 (11 digits)=0 41 21 81131195 (13 digits)

Numbers with 12 or 13 Digits

This case is in many ways similar to that examined above.

In particular, the "if" function checks that the initial number consists of 12 or 13 digits, and also verifies the presence of the following three conditions:
the first digit is 0,
the second digit is different from 0, and
the third digit is different from 0.

In order to proceed, in the way described above, with the addition of the CSP code, the "then" function replaces the digits in the second and third positions with the CSP code. This code, as stated above, typically consists of two digits (for example "41").

Example 0 23 21 8113119 (12 digits)=0 41 21 8113119 (12 digits)
0 23 21 81131195 (13 digits)=0 41 21 81131195 (13 digits)

International Numbers with the "00" Code

In this case, the "if" function determines whether the first and second number are equal to 0, while the "then" function replaces the digits in the third and fourth position with the two digits of the CSP code.

Example 00 23 39 01234567 (14 digits)=00 41 39 01234567 (14 digits)
00 21 44 01234567 (14 digits)=00 41 44 01234567 (14 digits)

Local Numbers with Prefixes in the Format "+XY"

In this case, the country code of the subscription country "+XY" (for example "+55") is removed and the CSP code is supplied.

In this case, the "if" function identifies the presence of the symbol "+" in the first position, and the presence of the digits "X" and "Y" (for example a digit "5" in both cases, in case of the code "+55"), while the "then" function removes the code "+XY", replacing it with the code "0" followed by the CSP.

Example

+55 71 8113119 (12 digits)=0 41 71 8113119 (12 digits)
+55 21 81131195 (13 digits)=0 41 21 81131195 (13 digits)

International Numbers with the Code "+"

In this case, the "if" function detects the presence of the symbol "+" in the first position and also the presence in the second and third positions of digits different from the digits X and Y considered above.

The "then" function removes the code "+" and prefixes the number with the CSP code preceded by two zeroes, for example in the format "0041" in the case where the CSP code is 41.

If the menu option represented by step 104*b* (user "outside Brazil") has been chosen, the user is again asked to enter his/her prefix to enable the application to reformat the numbers in the address book, in order to facilitate calls from abroad, using the numbering rules according to international standards.

The principles of the processing carried out in the various cases will be briefly examined for this case also, these principles again being based on an if/then logic mechanism, which can be easily implemented by the processing capacity normally available in a mobile terminal 1.

Numbers with 7 or 8 Digits

In this case also, the "if" function detects the length of the numbers (7 or 8 digits) and the absence of a local prefix (area code).

In this case, the "then" function prepends to the number the digit/symbol "+" and the country code (55 in the case of Brazil), if the user has entered his/her area code.

When selected by the user, the corresponding menu checks the number format of all the items in the address book, adding the specified local prefix (area code) and the country prefix (55 in the case of Brazil) to all the items. If the user has not specified a local prefix, the application does not carry out the reconfiguration.

Example 8113119 (7 digits)=+55 21 8113119 (12 digits)
81131195 (8 digits)=+55 21 81131195 (13 digits)

Numbers with 10 or 11 Digits

In this case, as well as checking that the length of the initial number is 10 or 11 digits, the "if" function checks the presence of the digit "0" as the first number and that the following digits (second and third) are different from "0".

The "then" function proceeds to remove the "0" from the first position and prepend the code "+55" to the number, which is thus brought into conformity with international standards.

Example 0 71 8113119 (10 digits)=+55 71 8113119 (international)
0 21 81131195 (11 digits)=+55 21 81131195 (international)

Numbers with 12 or 13 Digits

In this case also, the "if" function not only checks the length of the number, but also implements the detection procedure on the first three digits described in the preceding example.

The "then" function removes the "0" from the first position, removes the second and third digits and prepends the code "+55" to the number.

Example 0 41 71 8113119 (12 digits)=+55 71 8113119 (international)
0 41 21 81131195 (13 digits)=+55 21 81131195 (international)

Numbers with the "00" Code

In this case, the "if" function detects the presence of the digit "0" in the first two positions, while the "then" function removes the first four digits and adds the code "+".

Example 00 41 41 01234567 (14 digits)=+41 01234567 (international)
00 41 39 01234567 (14 digits)=+39 01234567 (international)

Numbers with the Code "+XY" (for Example "+55" for Brazil) and Numbers with the Code "+" in General These numbers are not reconfigured.

The above rule (in other words non-reconfiguration) is also applicable in the case of numbers for access to special services (for example 0300, 0500, 0800). However, it is preferable for tests to be conducted on these numbers in order to prevent them from being altered in an undesirable way.

This can be done by providing, for example, an "if" function which verifies the length of the number (10 or 11 digits) and also detects the presence of the digits "8", "3" or "5" in the second position and the presence of the digit "0" in the third position.

In this case, the "then" function does not carry out any reconfiguration of the numbers in the storage area 2, and if necessary sends a message to the user informing him/her that the number in question is not to be reconfigured.

In the currently preferred embodiment, the entry of the local prefix (area code) by the user can be configured in the following way:

dimensions "0-2" which enable the user to leave the item completely blank but do not permit the entry of a single digit.

Other control functions include the verification that only numerical values have been entered, with the possibility of storing the last number entered by the user.

It will be appreciated that the solution described above overcomes the problem associated with the user's need to be able to select the operator for long distance calls at any time, where the entitlement to make this selection on a call-by-call basis is stipulated in the current regulations. The solution described herein enables all the numbers stored in the phonebook or address book (in a SIM card, for example) to be modified by means of a simple operation selected from a menu. The modification is reversible when the terminal is used in different environments subject to different regulations (examples of these environments were given above with reference to the use of the terminal in Brazil, on the one hand, or in different countries on the other hand).

The solution described herein makes it unnecessary to enter the same contact in different sections of a phonebook, and also permits the "replay" of a call received without the need to modify the number manually. Moreover, the solution described herein enables the user's phonebook to be used equally well in his/her own country and abroad, by means of a simple and immediate reversibility mechanism.

An example of a further possible configuration of the user indicators stored in the address book of a terminal for telecommunications networks is that which comprises, for each number in the address book, a code for activation of a call by the network. It can be used, for example, to enable users with billing plans not directly authorizing particular types of call, for example in international roaming, to make such calls. For example, a code can be associated with the number "nnnnnnn" of the called user, to enable the network to call back the calling user and put him/her through to the desired called user. In this configuration, for example, all the user identifiers included in the address book associated with the terminal are modified by adding the said call activation code. For example, if the call activation code consists in prepending to the called number the symbols *148* and following the number with the symbol #, the operation carried out by the application for modifying the identifiers in the address book according to this configuration is as follows:

nnnnnnn=*148*nnnnnnn#

Another configuration of the identifiers in the address book can provide for the association of a billing code, for example one which debits the call to the called user, with each identifier in the address book.

A further configuration of the identifiers in the address book can be used to enable each call to be made from one of the two (or more) lines (calling user identifiers) associated with a terminal or with a SIM card. By activating a reconfiguration of the identifiers in the address book in this mode, the calling user can make calls from one of the lines available to the terminal or to the SIM card.

Clearly, provided that the principle of the invention is retained, the details of embodiment and the forms of implementation can be varied widely from what has been described and illustrated, without departure from the scope of the present invention as defined by the attached claims.

The invention claimed is:

1. A method for processing user identifiers stored in a terminal for telecommunications networks, comprising:
    modifying the user identifiers by including an identification code of an operator selected by a user of the terminal or at least one of a country prefix and a local prefix;
    selectively organizing said user identifiers in one of a plurality of configurations, said plurality of configurations comprising at least a first and a second configuration; and
    generating said user identifiers organized in said at least the first configuration and the second configuration by means of an if/then mechanism, in which the if function identifies at least one value selected from the group of:
        a number of digits included in the user identifiers to be organized, and
        the digits present in specified positions of said user identifiers to be organized;
    wherein said first configuration comprises the user identifiers organized with the insertion of the identification code of the operator selected by the user of the terminal,
    wherein said second configuration comprises the user identifiers organized with the inclusion of at least one of the country prefix and the local prefix, and
    wherein the modified user identifiers are stored in the terminal.

2. The method as claimed in claim 1, wherein said identification code of the operator is an identifier of a long distance operator.

3. The method as claimed in claim 1, comprising generating said user identifiers organized in said at least the first configuration and the second configuration by means of an if/then mechanism in which the then function implements at least one function selected from the group of
    adding said identification code to the user identifiers to be organized in said first configuration, and
    associating with the user identifiers to be organized at least one of the country prefix and the local prefix in said second configuration.

4. The method as claimed in claim 1, comprising receiving from the user of the terminal information relating to a location of said terminal and the operation of switching said user identifiers between said first configuration and said second configuration following the receipt of the information.

5. The method as claimed in claim 1, comprising detecting a location of said terminal and of switching said user identifiers between said first configuration and said second configuration according to the detected location of the terminal.

6. The method as claimed in claim 1, comprising organizing said user identifiers originally consisting of 7 or 8 digits
    by adding a digit 0, the local prefix identified by the user and said identification code to the user identifiers organized in said first configuration, and
    by adding a character "+", the country prefix and the local prefix provided by the user to the user identifiers organized in said second configuration.

7. The method as claimed in claim 1, comprising organizing said user identifiers originally consisting of 10 or 11 digits
    by adding said identification code to the user identifiers organized in said first configuration, and
    by removing a "0" in a first position and adding the country prefix to the user identifiers organized in said second configuration.

8. The method as claimed in claim 1, comprising organizing said user identifiers originally consisting of 12 or 13 digits
    by replacing a second and a third digit with said identification code in the user identifiers organized in said first configuration, and
    by removing a "0" in a first position and the second and third digits, replacing the second and third digits with an international prefix in the user identifiers organized in said second configuration.

9. The method as claimed in claim 1, comprising organizing said user identifiers originally comprising the code "00"
    by replacing a third and a fourth digit with said identification code in the user identifiers organized in said first configuration, and
    by removing the first four digits and adding a symbol "+" to the user identifiers organized in said second configuration.

10. The method as claimed in claim 1, comprising organizing said user identifiers originally comprising said country prefix
    by removing said country prefix and including said identification code in the user identifiers organized in said first configuration, and
    by leaving the user identifiers unchanged in the case of said second configuration.

11. The method as claimed in claim 1, comprising organizing said user identifiers originally comprising a symbol "+"
    by removing the symbol "+" and entering said identification code preceded by two "0" symbols in the user identifiers organized in said first configuration, and
    by leaving the user identifiers unchanged in the case of said second configuration.

12. The method as claimed in claim 1, comprising: when indicators corresponding to special services are present, leaving the user identifiers unchanged without carrying out the configuration in said at least the first and at least the second configuration.

13. The method as claimed in claim 1, wherein said plurality of configurations comprises a network call configuration with an associated identification code consisting of a code for activation of a call by the network designed to enable said terminal to be called back by the corresponding network.

14. The method as claimed in claim 13, wherein said call activation code is associated with a prepaid roaming service.

15. The method as claimed in claim 1, wherein said plurality of configurations comprises a debiting configuration with an associated identification code consisting of a billing code for configuring stored numbers of said terminal for making calls to be debited to a called user.

16. The method as claimed in claim 1, wherein said plurality of configurations comprises an authorization configuration with an associated identification code consisting of a code which authorizes calls from two or more lines associated with the terminal or with a corresponding card of the SIM type.

17. A non-transitory computer readable medium encoded with a computer program product loadable into the memory of at least one computer and containing portions of software code for implementing the method according to any one of claims 1, 2, 3, and 5-16.

18. A terminal for telecommunications networks, comprising at least a storage area for storing user identifiers and acting as an electronic address book, and processing capacity for processing the user identifiers stored in said storage area, said processing capacity being configured for modifying the user identifiers by including an identification code of an operator selected by a user of the terminal or at least one of a country prefix and a local prefix and organizing said user identifiers selectively in one of a plurality of configurations, said plurality of configurations comprising at least a first and a second configuration,
  wherein said first configuration comprises the user identifiers organized with the insertion of the identification code of the operator selected by the user of the terminal,
  wherein said second configuration comprises the user identifiers organized with the inclusion of at least one of the country prefix and the local prefix, and
  wherein the modified user identifiers are stored in the terminal, and
  wherein said processing capacity is configured for generating said user identifiers organized in one of said at least the first and at least the second configuration by means of an if/then mechanism, in which the if function identifies at least one value selected from the group of:
    a number of digits included in the user identifiers to be organized, and
    the digits present in specified positions of said user identifiers to be organized.

19. The terminal as claimed in claim 18, wherein said identification code of the operator is an identifier of a long distance operator.

20. The terminal as claimed in claim 18, wherein said processing capacity is configured for generating said user identifiers organized in one of said at least the first and at least the second configuration by means of an if/then mechanism, in which the then function implements at least one function selected from the group of:
  adding said identification code to the user identifiers to be organized in said first configuration, and
  associating with the user identifiers to be organized at least one of the country prefix and the local prefix in said second configuration.

21. The terminal as claimed in claim 18, wherein the terminal can receive from the user of the terminal information relating to a location of said terminal and said processing capacity is configured for switching said user identifiers between said first configuration and said second configuration following the receipt of the information.

22. The terminal as claimed in claim 18, wherein the terminal can detect a location of said terminal and said processing capacity is configured for switching said user identifiers between said first configuration and said second configuration according to the detected location of the terminal.

23. The terminal as claimed in claim 18, wherein said processing capacity is configured for organizing said user identifiers originally consisting of 7 or 8 digits
  by adding a digit 0, the local prefix identified by the user and said identification code to the user identifiers organized in said first configuration,
  by adding a character "+", the country prefix and the local prefix provided by the user to the user identifiers organized in said second configuration.

24. The terminal as claimed in claim 18, wherein said processing capacity is configured for organizing said user identifiers originally consisting of 10 or 11 digits
  by adding said identification code to the user identifiers organized in said first configuration, and
  by removing a "0" in a first position and adding the country prefix to the user identifiers organized in said second configuration.

25. The terminal as claimed in claim 18, wherein said processing capacity is configured for organizing said user identifiers originally consisting of 12 or 13 digits
  by replacing a second and a third digit with said identification code in the user identifiers organized in said first configuration, and
  by removing a "0" in a first position and the second and third digits, and replacing the second and third digits with an international prefix in the user identifiers organized in said second configuration.

26. The terminal as claimed in claim 18, wherein said processing capacity is configured for organizing said user identifiers originally comprising the code "00"
  by replacing a third and a fourth digit with said identification code in the user identifiers organized in said first configuration, and
  by removing the first four digits and adding a symbol "+" to the user identifiers organized in said second configuration.

27. The terminal as claimed in claim 18, wherein said processing capacity is configured for organizing said user identifiers originally comprising said country prefix
  by removing said country prefix and including said identification code in the user identifiers organized in said first configuration, and
  by leaving the user identifiers unchanged in the case of said second configuration.

28. The terminal as claimed in claim 18, wherein said processing capacity is configured for organizing said user identifiers originally comprising a symbol "+"
  by removing the symbol "+" and entering said identification code preceded by two "0" symbols in the user identifiers organized in said first configuration, and
  by leaving the user identifiers unchanged in the case of said second configuration.

29. The terminal as claimed in claim 18, wherein said processing capacity is configured for leaving the user identifiers unchanged, without carrying out the configuration in said at least the first and at least the second configuration, when user identifiers corresponding to special services are present.

30. The terminal as claimed in claim 18, wherein said plurality of configurations comprises a network call configuration with an associated identification code consisting of a code for activation of a call by the network, designed to enable said terminal to be called back by the corresponding network.

31. The terminal as claimed in claim 30, wherein said call activation code is associated with a prepaid roaming service.

32. The terminal as claimed in claim 18, wherein said plurality of configurations comprises a debiting configuration with an associated identification code consisting of a billing code for configuring stored numbers of said terminal for making calls to be debited to a called user.

33. The terminal as claimed in claim 18, wherein said plurality of configurations comprises an authorization configuration with an associated identification code consisting of a code which authorizes calls from two or more lines associated with the terminal or with a corresponding SIM-type card.

34. A card of the SIM type for a telecommunications network terminal, wherein said card hosts, at least partially, at least one of said storage area and said processing capacity for a terminal according to any one of claims 18, 19, 20, 22-33.

35. A terminal for telecommunications networks, comprising at least a storage area for storing user identifiers and acting as an electronic address book, and processing capacity for processing the user identifiers stored in said storage area, said processing capacity being configured for modifying the user identifiers by including an identification code of an operator selected by a user of the terminal or at least one of a country prefix and a local prefix and organizing said user identifiers selectively in one of a plurality of configurations, said plurality of configurations comprising at least a first and a second configuration, wherein said first configuration comprises the user identifiers organized with the insertion of the identification code of the operator selected by the user of the terminal, wherein said second configuration comprises the user identifiers organized with the inclusion of at least one of the country prefix and the local prefix, wherein the modified user identifiers are stored in the terminal, and wherein the terminal can receive from the user of the terminal information relating to a location of said terminal and said processing capacity is configured for switching said user identifiers between said first configuration and said second configuration following the receipt of the information.

* * * * *